United States Patent [19]

Weihrauch

[11] Patent Number: 4,988,146

[45] Date of Patent: Jan. 29, 1991

[54] PROCESS FOR THE PRODUCTION OF BRISTLE ARTICLES

[75] Inventor: Georg Weihrauch, Wald-Michelbach, Fed. Rep. of Germany

[73] Assignee: Coronet-Werke Heinrich Schlerf GmbH, Wald-Michelbach, Fed. Rep. of Germany

[21] Appl. No.: 391,932

[22] Filed: Aug. 10, 1989

[30] Foreign Application Priority Data

Aug. 23, 1988 [DE] Fed. Rep. of Germany ....... 3828571

[51] Int. Cl.⁵ .............................................. A46D 3/04
[52] U.S. Cl. ..................................... 300/21; 264/243; 15/191 R
[58] Field of Search ...................... 29/451, 452; 300/4, 300/5, 8, 10, 21; 264/243; 15/191 R, 192

[56] References Cited

U.S. PATENT DOCUMENTS 4,609,228 9/1989 Bickel ................................. 300/21 X
4,637,660 1/1989 Weihrauch ............................ 300/21

FOREIGN PATENT DOCUMENTS 3637750 5/1988 Fed. Rep. of Germany ........ 300/21

Primary Examiner—Timothy V. Eley
Attorney, Agent, or Firm—Antonelli, Terry, Stout & Kraus

[57] ABSTRACT

Bristle articles, which comprise a bristle carrier and thermoplastic bristles anchored therein are produced in that holes for receiving the bristles are formed on the bristle carrier, the fixing side ends of the bristles are melted, accompanied by a reduction of their length and the formation of a thickened portion and inserted with the thickened portion first into the holes on the bristle carrier. In order to be able to joint bristles from random thermoplastics with a bristle carrier made from a random material in a short time, the holes in the bristle carrier are formed with an at least zonally smaller free cross-section than that of the thickened portions on the bristle ends and that the thickened portions and/or the wall of the holes are heated to a joining temperature between the transition temperature and the flow temperature in the case of amorphous thermoplastics and to a temperature between the latter and the crystalline melting temperature with partly crystalline thermoplastics and are kept at this joining temperature, at which the thermoplastics are in the entropy elastic state and in this state the thickened portions are inserted in the holes by thermoforming.

12 Claims, 2 Drawing Sheets

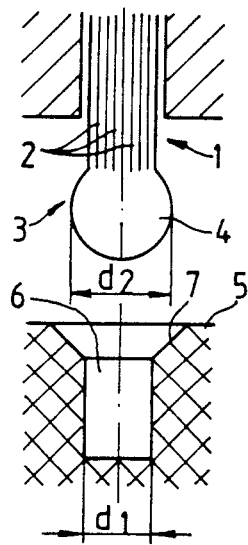
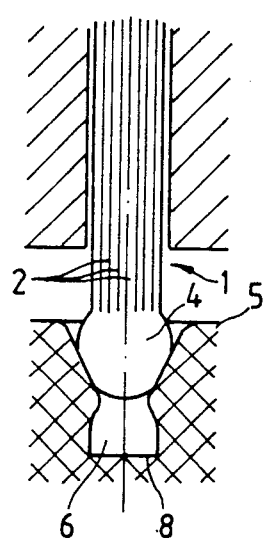
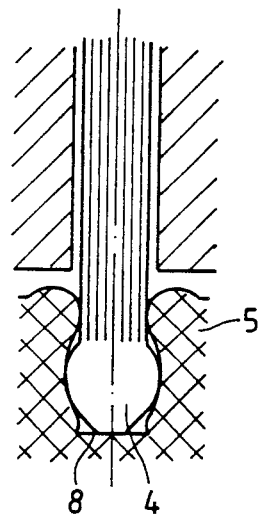
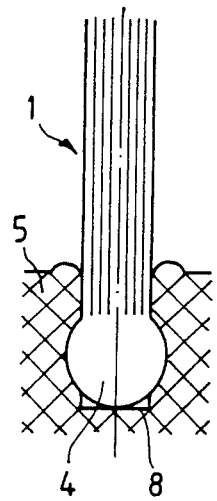
Fig. 1.1  Fig. 1.2  Fig. 1.3  Fig. 1.4
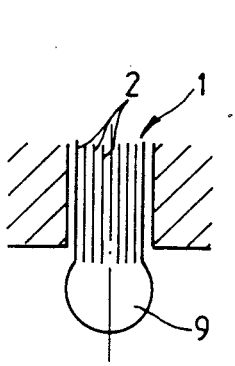
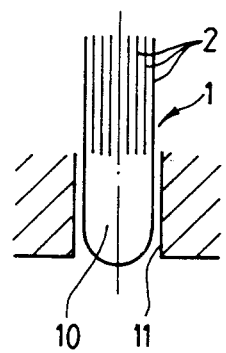
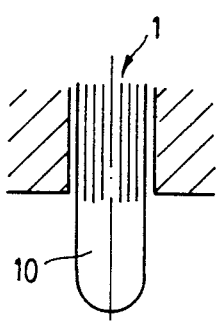
Fig. 2.1  Fig. 2.2  Fig. 2.3
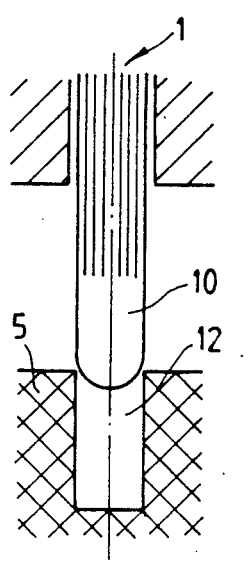
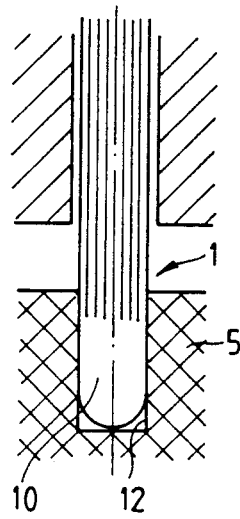
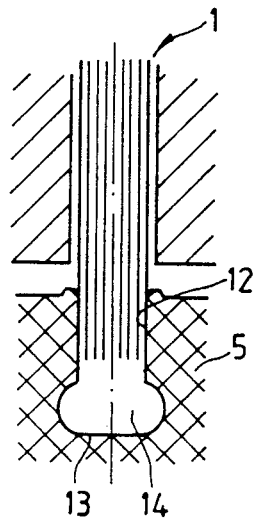
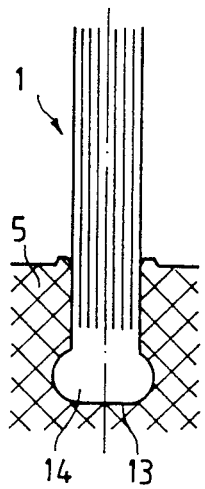
Fig. 2.4  Fig. 2.5  Fig. 2.6  Fig. 2.7

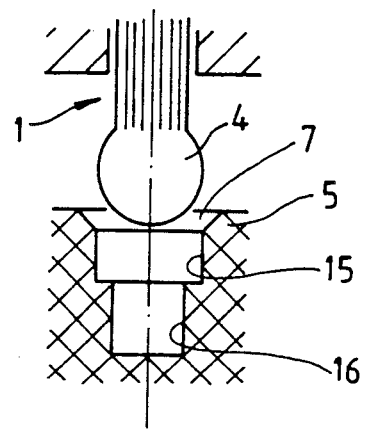
Fig. 3
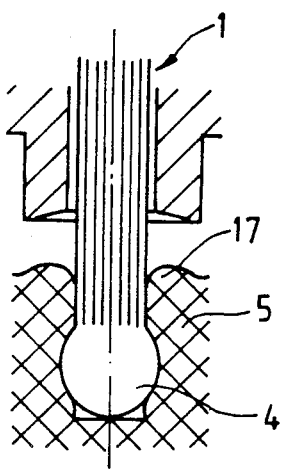
Fig. 4.1
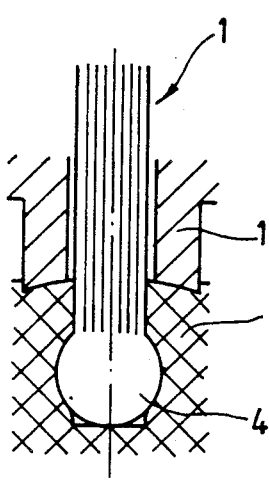
Fig. 4.2
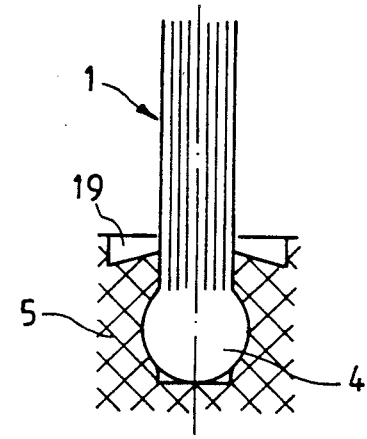
Fig. 4.3
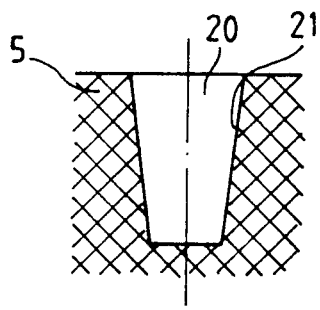
Fig. 5
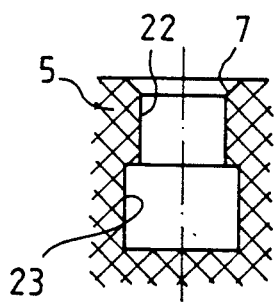
Fig. 6
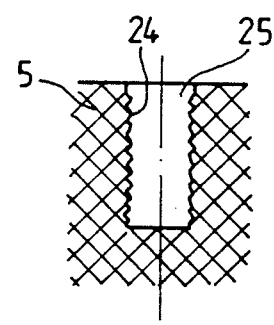
Fig. 7
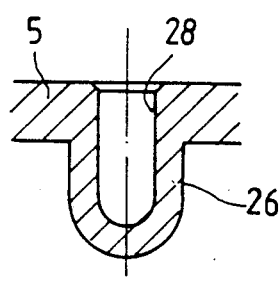
Fig. 8
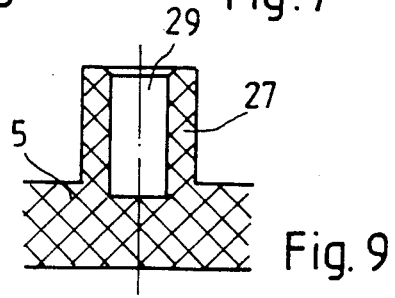
Fig. 9

PROCESS FOR THE PRODUCTION OF BRISTLE ARTICLES

BACKGROUND OF THE INVENTION

The invention relates to a process for the production of bristle articles, comprising a bristle carrier and thermoplastic material bristles anchored therein, in that holes for receiving the bristles are formed on the bristle carrier, the fixing-side ends of the bristles are melted, accompanied by a shortening of their length and the formation of a thickened portion and are inserted with the thickened portion first into the holes on the bristle carrier.

Following the discovery of thermoplastics and the use thereof in bristle articles, numerous attempts have been made to utilize the thermoplastic characteristics of such materials for fixing the bristles to the bristle carrier. In particular, the fixing-side end of the bristle bundles has been melted, so that a thickened portion is formed and is then used for fixing in the bristle carrier. Thus, for example, it is known from U.S. Pat. No. 2,664,316 to produce a paint brush in that the bristle bundle is inserted end is melted from the back. Subsequently the melted material of the bristles is displaced from the back into the undercut. Following cooling the bristle bundle is firmly anchored in the carrier.

In another known process described in, for example, U.S. Pat. No. 3,604,043, the fixing-side end of the bristle bundle is cylindrically shaped during the melting process, its external diameter corresponding to that of the holes in the bristle carrier. The holes are widened in the vicinity of the bottom to form undercuts. The still plastic end of the bristle bundle is inserted under pressure into the hole, so that the plastic mass can flow into the undercut.

A similar process proposed in DE-A-34 00 510 and U.S. Pat. No. 4,609,223, is based on a bristle carrier with bead-like projections on the edges of the holes, in which initially the bead-like projections projecting over the fixing side of the bristle carrier are smooth and then shaped inwardly into the holes, so that undercuts are formed. The still plastic, fixing side ends of the bristle bundle are then introduced under pressure into said holes, so that the plastic material fills the hole.

The butt welding of bristle bundles onto plastic bristle carriers is also known from EP-A-O 149 996 and corresponding U.S. Pat. No. 4,609,228, as is the injection molding of the fixing side thickened portions of bristle bundles in the plastic material of the bristle carrier. EP-A-O 142 885 and corresponding U.S. Pat. No. 4,635,313 and DE-C-35 11 528 and corresponding U.S. Pat. No. 4,892,698 also describe such injection molding processes. Finally, another known process in, for example, DE-A-O 34 03 341 and corresponding U.S. Pat. No. 4,637,660 makes use of the special characteristics of plastics, namely the molecular reorientation occurring on heating, in that the thickened portion is pressed onto the fixing side ends of the bristle in a planar bristle carrier, whose surface is melted. The bristle carrier melt flows together behind the thickened portion, because as a result of molecular reorientation the plastic attempts to reassume its original shape. The latter process has in particular made it possible for the first time to obtain a joint similar to the produced by welding, in which the bristle carrier and bristles can be made from different plastics.

It is finally known from DE-A-36 37 750 only to melt the holes in the bristle carrier and in particular the bottom thereof and to introduce the free bristle ends into the fluid melt, so that it rises between the bristles and between the latter and the wall of the hole. On cooling the bristles are anchored by the penetrated bristle carrier material.

All the aforementioned processes suffer from the common disadvantage that, as a result of the processing of the bristles and/or the bristle carrier close to or above the flow or melting point or temperature or, in the case of partly crystalline thermoplastics, the crystalline melting temperature or point, cooling takes a considerable time until an extraction-resistant joint is obtained, which leads to long machine cycle times.

The aim underlying the present invention resides in providing a process, in which it is possible in a minimum time to join bristles made from a thermoplastic material to random bristle carriers.

According to the invention the holes in the bristle carrier are constructed with an at least zonally smaller free cross-section than the cross-section of the thickened portions at the bristle ends and that the thickened portions and/or the wall of the holes are heated to a joining temperature between the transition temperature and the flow temperature in the case of amorphous thermoplastic and between the latter and the crystallite melting temperature in the case of partly crystalline thermoplastics or are kept at said joining temperature in which the thermoplastics are in the entropy elastic state and in this state the thickened portions are inserted by thermoforming into the holes.

Contrary to the prior art, the invention uses for the joining process the so-called entropy elasticity (thermoelasticity) of all thermoplastic materials above the temperature (transition temperature), at which the molecular orientation freezes, but below the temperature (flow temperature in the case of amorphous or crystallite melting temperature in the case of partly crystalline thermoplastics), in which the molecular union has dissolved to such an extent that the thermoplastic starts to flow and cannot molecularly re-form, instead of the plastic behavior of the plastic material above the crystallite melting or flow temperature. As a result of its molecular reorientation, on cooling the thermoplastic attempts to reassume the original shape. The invention makes use of the shape change which occurs for joining the bristles and the bristle carrier. The following procedure is adopted.

Bristles in monofilament or multifilament form are initially melted at their fixing side ends. In known manner, the originally stretched molecular structure passes into a convoluted molecular structure which, accompanied by the shortening of the bristle length, leads to a thickening at the fixing side end. This structure is maintained on cooling, the transition temperature (also called "softening temperature" on heating) being above ambient temperature in the case of amorphous thermoplastics and below it with partly crystalline thermoplastics. If the bristles are introduced by the thickened portion at an elevated temperature, which is above the transition temperature and preferably just below the flow temperature (in the case of amorphous thermoplastics) or in the vicinity of the crystalline melting temperature (in the case of partly crystalline thermoplastics) are inserted in the holes on the bristle carrier under pressure or tension, then on traversing the cross-sectional reduction of the hole and accompanied by the building up of internal stresses, the thickened portion undergoes a shape change as a result of the thermoelasticity of the plastic. On cooling, the plastic attempts to reassume the original shape of the thickened portion (relaxation)in the vicinity thereof, accompanied by the reduction of the internal stresses, but is prevented from doing so by the cross-sectional reduction. As a result the internal stresses are at least partly retained and are used as clamping forces for the bristles in the bristle carrier hole. This effect occurs independently of the bristle carrier material, so that random materials can be used for this purpose. If the bristle carrier is made from a thermoplastic, then only the wall of the hole need be heated to the elevated temperature. In this case the relaxation of the hole wall ensures the fixing of the bristles or the thickened portion thereof. In the case of this pair of materials both can be raised to the joining temperature, i.e. both the thickened portion at the bristle ends and the hole wall. A thermoforming process is involved in all cases.

This leads to a firm seating of the bristles in the bristle carrier. The major advantage of the inventive process is that the melting of the bristle ends for forming the thickened portion can take place in a process stage separate from the actual joining process and the actual joining or connection can be performed at a lower temperature than the flow temperature, so that for the final cooling to an adequately low handling temperature, it is necessary to overcome a much smaller temperature difference and there is no need for the otherwise necessary removal of the melting heat, which leads to a significant reduction in the machine cycle time for the actual joining process.

The decisive temperatures for certain thermoplastics are given below:

| | Partly Crystalline Thermoplastics | |
|---|---|---|
| | Softening or (glass) transition temperature ET | Crystallite melting temperature KT |
| PE | −125° C. | +135° C. |
| PP | −20° C. | +165° C. |
| PA 6,6 | +57° C. | +265° C. |
| | Amorphous Thermoplastics | |
| | Softening or (glass) transition temperature. ET | Flow or melting temperature FT |
| PVC | +80° C. | +170° C. |
| PS | +90° C. | +180° C. |

The joining temperature of bristles and bristle carrier in the case of a thermoplastic/thermoplastic material pairing of said elements will preferably in the range of the lower KT or FT of the two joining partners and will mainly utilize the shape change thereof. Thus, e.g. in the case of bristles made from PA (polyamide) with a very high crystallite melting point of 265° C. and a bristle carrier of PP (polypropylene) and with a joining temperature close to its crystallite melting point of 165° C. an excellent anchoring of the bristles is obtained. However, if the bristle carrier is made from a rigid material having no thermoplastic behavior in the temperature range under discussion here, then the joining temperature must be fixed in accordance with the participating thermoplastic of the bristles, i.e. about 265° C. in the case of PA. In general, it can also be stated that the maximum shape changes are obtained with partly crystalline thermoplastics close to the KT, whereas with amorphous thermoplastics this is in the middle range between ET and FT.

According to an embodiment of the invention the thermoplastic used for the bristles has a greater deformation resistance at the joining temperature than the thermoplastic used for the bristle carrier. Thus, as in the aforementioned material example, in this case substantially only the shape change and relaxation of the bristle carrier material is used.

Instead of this, according to another embodiment, a thermoplastic can be used for the bristle carrier which has a higher deformation resistance at the joining temperature than the thermoplastic used for the bristles. In this case the shape change is essentially limited to the thickened portion at the fixing side ends of the bristles.

It has been found that in the case of the process according to the invention, it is also possible to use bristle carriers from completely different materials, e.g. wood or thermosetting plastics. A completely satisfactory anchoring of the bristles still occurs and a self-closure is always obtained. With a rigid bristle carrier, e.g. of wood or thermosetting plastic, surface roughness into which the thermoplastic material of the bristles penetrates by relaxation is sufficient as the cross-sectional reduction.

It has also proved advantageous if the joining process is performed at such a high speed, that the joining time is below the relaxation time of the participating thermoplastic or thermoplastics. The invention makes use of the fact that the deformation resistance also increases with increasing deformation speed, i.e. the joining partner appears to be harder than it would be as a result of its temperature. This e.g. makes it possible to insert the thickened portion on the bristle ends in the bristle carrier a relatively short time after melting.

According to another preferred embodiment of the invention, the holes on the bristle carrier can be given a larger free cross-section in the vicinity of the edge of the hole than the thickened portion on the bristle ends and following this can have a cross-section decreasing to the narrowest cross-section.

As a result of the larger free cross-section of the holes in the vicinity of the edge thereof and the constant reduction to the narrowest cross-section, a type of insertion bevel is formed, which facilitates the introduction of the thickened portion into the hole and can optionally be used for receiving displaced material.

If, according to another embodiment of the invention, the holes are provided with a cross-sectional increase in the insertion direction of the bristles behind the narrowest cross-section, then the space behind the narrowest cross-section can be used for the relaxation of the previously shaped thickened portion. This gives a reliable self-closure.

Another embodiment of the inventive process is characterized in that the edge of the holes is shaped onto the bristle carrier following the insertion of the bristles therein.

This in particular gives a surface free from holes or depressions, which provides an effective dirt protection. On smoothing the surface, a pressing action can also take place on any excessively forced back material of the thickened portions.

On the basis of the process defined hereinbefore, the problem of the invention can also be solved in that the thickened portions on the bristle ends and the wall of the holes of the bristle carrier comprising a thermoplastic is heated to a joining temperature between the transition temperature and the flow temperature for amorphous thermoplastics and to a joining temperature between the latter and the crystalline melting temperature in the case of partly crystalline thermoplastics or are kept at this joining temperature at which the thermoplastics are in the entropy elastic state and in this state the thickened portions are introduced into the holes and accompanied by the thermoforming of the wall of the hole, are bulged up outwards on the bottom of the hole.

Use is made of the same effects, in that following the bulging up of the thickened portion on the bottom of the hole, the hole wall is initially widened and then relaxed accompanied by the fixing of the deformed thickened portion.

In principle, any random geometry can be used for the bristle carrier. However, for the performance of the inventive process, a bristle carrier has proved advantageous, which is characterized in that it comprises a plate-like carrier part with sleeve-like projections projecting over the same on the bristle side or the back and that the holes on the bristle carrier receiving the bristles are located within the projections, at least over a larger part of the axial extension thereof.

In this embodiment, the wall of the hole can be more rapidly brought to the necessary joining temperature due to its smaller wall thicknesses than with a solid bristle carrier.

BRIEF DESCRIPTION OF THE DRAWINGS

The invention is described in greater detail hereinafter relative to non-limitative embodiments and the attached drawings, wherein:

FIGS. 1.1 to 1.4 are schematic views representing the process sequence in a first embodiment of the present invention;

FIGS. 2.1 to 2.7 are schematic views of the process sequence in a second embodiment of the present invention;

FIG. 3 is schematic view of a bristle carrier variant corresponding to FIG. 1.1.;

FIGS. 4.1 to 4.3 are schematic views of the process sequence in accordance with another embodiment of the present invention; and FIGS. 5 to 9 are schematic view of further embodiments of the bristle carrier for performing the process.

DETAILED DESCRIPTION

FIG. 1.1 shows a bristle bundle 1 with a plurality of thermoplastic bristles 2 having at the fixing side end 3 thereof a thickened portion 4. In addition, a detail from said bristle carrier 5 with a hole 6 is shown. Hole 6 is at least zonally, in the represented embodiment over most of its length, provided with a free cross-section or a diameter d1, which is smaller than the cross-section or diameter d2 of the thickened portion 4 at the fixing side end 3 of the bristle bundle 1. Hole 6 also has a widened edge 7 which, as will be described hereinafter, initially serves as an insertion bevel for thickened portion 4.

The thickened portion 4 at the fixing side end 3 of the bristle bundle 1 is obtained in that the free ends of the bristles are thermally or ultrasonically melted, so that the length of the bristles is reduced and the melt coalesces to a melt bead, which assumes a roughly spherical form and retains same on cooling. In the case of amorphous thermoplastics melting takes place on reaching the flow temperature and in the case of partly crystalline thermoplastic in the vicinity of the crystalline melting temperature. The molecular structure formed in the thickened portion is frozen on reaching a specific temperature, which is above ambient temperature with partly crystalline thermoplastics. In the range between the flow temperature and the transition temperature, it is readily possible to shape the thickened portion by shaping forces due to its entropy elastic characteristics. In this state, the fixing side end 3 of bristle bundle 1 is inserted in hole 6 on bristle carrier 5.

In the embodiment of FIG. 1 the bristle carrier 5 is also made from a thermoplastic material, preferably such a material whose deformation resistance is lower at the elevated joining temperature than that of the bristle material. The hole 6 or its wall is heated to an elevated temperature which, as a function of the nature of the thermoplastic, is below the flow or crystalline melting point. Bristle bundle 1 with thickened portion 4 is then introduced into the hole 6 (FIG. 1.2), the thickened portion 4 starring to deform at the end of the insertion bevel 7 and simultaneously the wall of hole 6 thermoelastically yields and is moved somewhat downwards. As a result of this thermoelasticity of the bristle carrier material and the higher deformation resistance of the bristle material, the hole wall material is displaced upwards and the thickened portion finally strikes the bottom 8 of the hole. As a result of the thermoelastic behavior and the different deformation resistances, the thickened portion 4 reassumes its original shape, whilst the wall of the hole, due to the relaxation of the bristle carrier material, tightly embraces the thickened portion 4 (FIG. 1.4). In this position bristle bundle 1 is firmly anchored in bristle carrier 5.

FIG. 2 describes another embodiment with respect to its process sequence. Here again, the ends of the bristles 2 are melted to a thickened portion 9, which is shaped in a following operation (FIG. 2.2) to a cylindrical end part 10, in that e.g. the bristle bundle 1 is drawn back into a die (FIG. 2.2). In this case the bristle carrier 5 has a cylindrical hole 12, which has roughly the same cross-section as the cylindrical end part 10 on bristle bundle 1. Once again the hole wall is heated to a temperature below the flow or crystalline melting temperature. The cylindrical end part 10 on bristle bundle 1 is at an elevated temperature. The bristle bundle 1 with its cylindrical end part 10 is introduced preferably at high speed into the hole 12 (FIGS. 2.4 and 2.5). When the cylindrical end part 10 strikes against the bottom 13 of hole 12, end part 10 is bulged up and deformed in the manner shown in FIG. 2.6. The material of bristle carrier 5 thermoelastically yields directly above the bottom 13 of hole 12 and partly gives way upwards. Here again, preferably the deformation resistance of the bristle carrier material is lower than that of the bristle material, so that the ned part 14 deformed during bulging up retains its shape and in the finally cooled state is firmly fixed in the bristle carrier material (FIGS. 2.6 and 2.7).

FIG. 3 shows an embodiment of a bristle carrier with a different hole configuration. The hole once again has an insertion bevel 7 similar to that in FIG. 1. Following onto this it has a cylindrical portion 15, whose diameter roughly corresponds to that of the thickened portion 4. By means of a step, a further cylindrical portion 16 is connected, whose cross-section is reduced compared with the thickened portion 4. By heating the hole wall and an elevated temperature on the thickened portion 4, once again a joining process takes place and the situation shown in FIG. 4.1 is reached at the end thereof. In this embodiment, the upwardly displace material 17 of the bristle carrier is shaped by means of a mold 18, so that a smooth surface, optionally provided with depressions 19 is formed on the bristle carrier 5 (FIGS. 4.2 and 4.3).

FIGS. 5 and 6 show further embodiments of the bristle carrier 5. In the embodiment according to FIG. 5, the cross-sectional reduction of hole 20 compared with the not shown thickened portion on the bristle bundle is obtained through a conical configuration of hole wall 21. The cross-section in the insertion region can correspond to that of the thickened portion and subsequently becomes constantly smaller. In the embodiment according to FIG. 6, there is once again an insertion bevel 7, following onto it a cross-sectional reduction 22 and following onto the latter a cross-sectional increase 23.

FIG. 7 shows a bristle carrier 5 made from a material riding at elevated temperature, e.g. wood or metal. In the vicinity of the wall of hole 25, it can be provided with surface roughness 24 made in any way or resulting from the nature of the material. If the thickened portion 4 of the bristle bundle is inserted in hole 25 at a temperature just below the flow or crystallite melting point, then the thickened portion is thermoelastically deformed and relaxes in the surface roughness 24.

In the embodiment according to FIGS. 8 and 9, the bristle carrier 5 is constructed in plate-like manner and is provided with sleeve-like projections 26 on its back or sleeve-like projections 27 on its bristle side, the hole 28,29 for fixing the bristle bundle being largely located within the sleeve-like projection 26, 27. Here again, the hole wall is heated to an elevated temperature and the bristle bundle is inserted in the manner described hereinbelow.

What is claimed is:

1. Process for production of articles containing thermoplastic bristles, the method comprising the steps of melting fixing-side ends of the thermoplastic bristles accompanied by a shortening of a length of the bristle and formation of a thickened portion, providing a thermoplastic bristle carrier having holes within at least zonally smaller free cross-section than a cross-section of the thickened portion of the bristles for receiving the thickened portion of the bristles, inserting the thickened portions into the holes of the bristle carrier, heating at least one of the thickened portions and a wall of the holes to a joining temperature between a transition temperature and a flow temperature with amorphous thermoplastic and between the flow temperature and a crystallite melting temperature with partly crystalline thermoplastics or maintaining the joining temperature in which the thermoplastics are in an entropy elastic state so as to enable the thickened portions to be inserted by thermoforming into the holes.

2. Process according to claim 1, wherein the thermoplastic of the bristles has a greater deformation resistance than the thermoplastic of the bristles carrier at the joining temperature.

3. Process according to claim 1, wherein the thermoplastic of the bristle carrier has a greater deformation resistance than the thermoplastic of the bristles at the joining temperature.

4. Process for production of articles containing thermoplastic bristles, the method comprising the steps of melting fixing-side ends of the thermoplastic bristles accompanied by a shortening of a length of the bristles and a formation of a thickened portion, providing a bristle carrier having holes with at least zonally smaller free cross-section than a cross-section of the thickened portion of the bristles for receiving the thickened portions of the bristles, inserting the thickened portions into the holes of the bristle carrier, heating at least one of the thickened portions and a wall of the holes to a joining temperature between a transition temperature and a flow temperature with amorphous thermoplastic and between the flow temperature and a crystallite melting temperature with partly crystalline thermoplastics or maintaining the joining temperature in which the thermoplastics are in an entropy elastic state so as to enable the thickened portions to be inserted by thermoforming into the holes, and wherein the bristle carrier includes a material rigid at the joining temperature.

5. Process according to claim 4, wherein the wall of the holes includes a surface roughness for defining the zonally smaller free cross-section.

6. Process according to one of claims 1 to 5, wherein a joining time of the bristles to the bristle carrier is less than a relaxation time of the thermoplastic used.

7. Process according to claim 6, further comprising the step of directly cooling at least one of the bristle carrier and the bristles after joining.

8. Process according to one of the claims 1 to 5, wherein an edge of the holes on the bristle carrier include a larger free cross-section than the thickened portion followed by a cross-section decreasing to the zonally smaller free cross-section.

9. Process according to claim 8, wherein the holes on the bristle carrier include a cross-sectional enlargement in a bristle insertion direction behind the zonally smaller free cross-section.

10. Process according to one of the claims 1 to 5, wherein an edge of the holes is shaped on the bristles following the insertion of the thickened portion of the bristles into the holes in the bristle carrier.

11. Process for the production of articles containing thermoplastic bristles, the process comprising the steps of melting fixing-side ends of the bristles accompanied by a shortening of a length of the bristles and formation of a thickened portion, providing a thermoplastic bristle carrier having holes for receiving the thickened portions of the bristles, inserting the thickened portion into the holes on the bristle carrier, heating the thickened portions and wall of the holes of the bristle carrier to a joining temperature between a transition temperature and a flow temperature for amorphous thermoplastics and to a joining temperature between the flow temperature and the crystallite melting temperature for partly crystalline thermoplastics or maintaining the joining temperature at which the thermoplastics are in the entropy elastic state so as to enable the thickened portions to be introduced into the holes with an accompanying thermoforming of the wall of the holes and a bulging outward of the thickened portions on a bottom of the hole.

12. A bristle carrier for a bristle article containing thermoplastic bristles the bristle carrier comprising a plate-like carrier part including sleeve-like projections, holes provided on the bristle carrier for receiving the bristles, said holes being located within the projections over at least a larger part of a axial length of the respective projections, and wherein each of the holes are provided with an at least zonally smaller free cross-section than a cross-section of thickened portions of fixing ends of the bristles received in the respective bristle holes.

* * * * *